United States Patent
Grummert et al.

(10) Patent No.: US 11,219,867 B2
(45) Date of Patent: Jan. 11, 2022

(54) SINGLE-USE FILTERING MODULE AND SINGLE-USE CLEANING MODULE, EACH INSERTABLE IN A MODULAR FILTERING SYSTEM

(71) Applicant: SARTORIUS STEDIM BIOTECH GMBH, Goettingen (DE)

(72) Inventors: Ulrich Grummert, Bad Sooden-Allendorf (DE); Martin Leuthold, Goettingen (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 293 days.

(21) Appl. No.: 16/613,642

(22) PCT Filed: May 8, 2018

(86) PCT No.: PCT/EP2018/061916
§ 371 (c)(1),
(2) Date: Nov. 14, 2019

(87) PCT Pub. No.: WO2018/210644
PCT Pub. Date: Nov. 22, 2018

(65) Prior Publication Data
US 2020/0078740 A1 Mar. 12, 2020

(30) Foreign Application Priority Data
May 15, 2017 (DE) ...................... 10 2017 110 482.8

(51) Int. Cl.
*B01D 65/02* (2006.01)
*B01D 61/18* (2006.01)

(52) U.S. Cl.
CPC ............ *B01D 65/02* (2013.01); *B01D 61/18* (2013.01); *B01D 2311/25* (2013.01);
(Continued)

(58) Field of Classification Search
CPC .... B01D 65/02; B01D 61/18; B01D 2311/25; B01D 2313/18; B01D 2313/243;
(Continued)

(56) References Cited

U.S. PATENT DOCUMENTS

| 5,928,880 A | 7/1999 | Wilding et al. |
| 6,406,623 B2 | 6/2002 | Petersen et al. |

(Continued)

FOREIGN PATENT DOCUMENTS

| DE | 202009003680 U1 | 8/2009 |
| DE | 102013017036 A1 | 4/2015 |

(Continued)

OTHER PUBLICATIONS

Sartorius Stedim Biotech. "Sartoflow? 10 Stainless Steel Holder", Aug. 19, 2006, pp. 1-2.
(Continued)

*Primary Examiner* — Waqaas Ali
(74) *Attorney, Agent, or Firm* — Dilworth IP, LLC

(57) ABSTRACT

The proposed prefabricated filtration module is provided for a modular filtration system, in particular a cross-flow filtration system, for low-volume screening applications. The prefabricated filtration module includes fluid ports and a plurality of components adjusted to low-volume screening applications, which are firmly integrated into the filtration module. The entire filtration module is designed as a single-use filtration module.

14 Claims, 4 Drawing Sheets

(52) U.S. Cl.
CPC .... *B01D 2313/18* (2013.01); *B01D 2313/243* (2013.01); *B01D 2315/10* (2013.01); *B01D 2315/16* (2013.01)

(58) Field of Classification Search
CPC ............ B01D 2315/10; B01D 2315/16; B01D 2313/143; B01D 2313/44; B01D 2313/50; B01D 2313/54; B01D 66/027; B01D 61/20; B01D 2313/58
See application file for complete search history.

(56) References Cited

U.S. PATENT DOCUMENTS

| | | |
|---|---|---|
| 7,270,744 B2 | 9/2007 | Petersen et al. |
| 7,384,409 B2 | 6/2008 | Fischer et al. |
| 9,528,085 B2 | 12/2016 | Reinbigler et al. |
| 10,350,516 B2 | 7/2019 | Winkler et al. |
| 2005/0010135 A1 | 1/2005 | Fischer et al. |
| 2008/0269468 A1* | 10/2008 | Vogel ................ C07K 14/755 530/414 |
| 2016/0129374 A1 | 5/2016 | Winkler et al. |
| 2017/0056825 A1* | 3/2017 | Schwan ................ C07K 1/34 |

FOREIGN PATENT DOCUMENTS

| | | |
|---|---|---|
| EP | 0129554 B1 | 12/1988 |
| EP | 1164019 A2 | 12/2001 |
| EP | 1495808 A1 | 1/2005 |
| EP | 2119492 A1 | 11/2009 |
| EP | 2255865 A1 | 12/2010 |
| EP | 2445616 B1 | 5/2012 |
| EP | 2907565 A1 | 8/2015 |
| WO | 2009017614 A1 | 2/2009 |
| WO | 2015095658 A1 | 6/2015 |

OTHER PUBLICATIONS

English Translation of the International Search Report; Application No. PCT/EP2018/061916; dated Oct. 2, 2018; 4 pages.

* cited by examiner

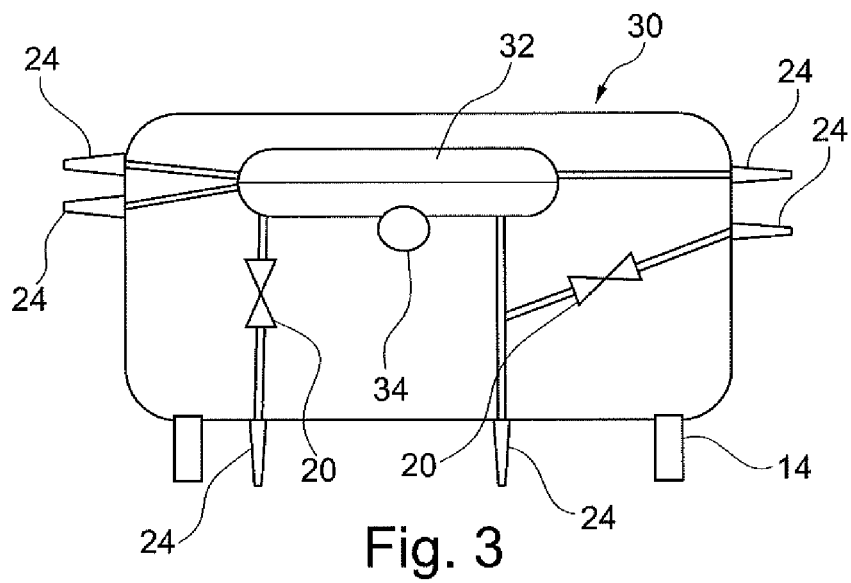
Fig. 3
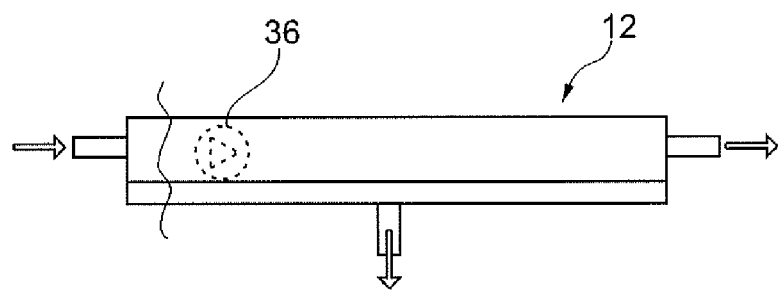
Fig. 4
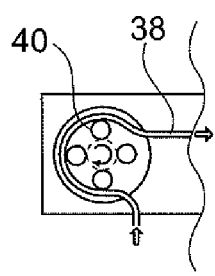 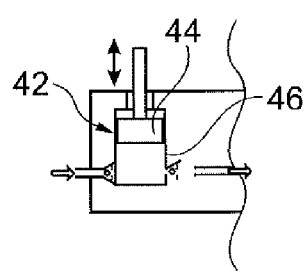 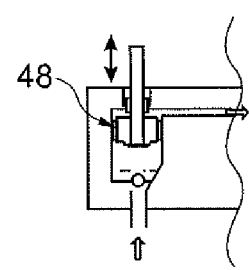
Fig. 5a      Fig. 5b      Fig. 5c

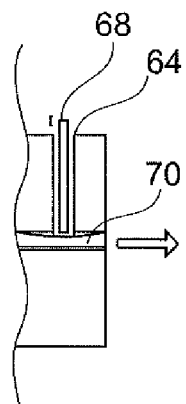
Fig. 7a
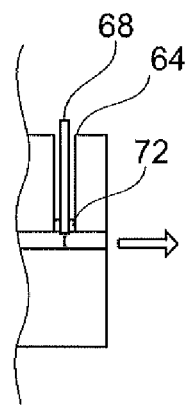
Fig. 7b
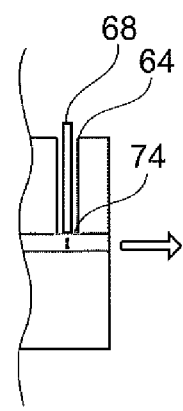
Fig. 7c
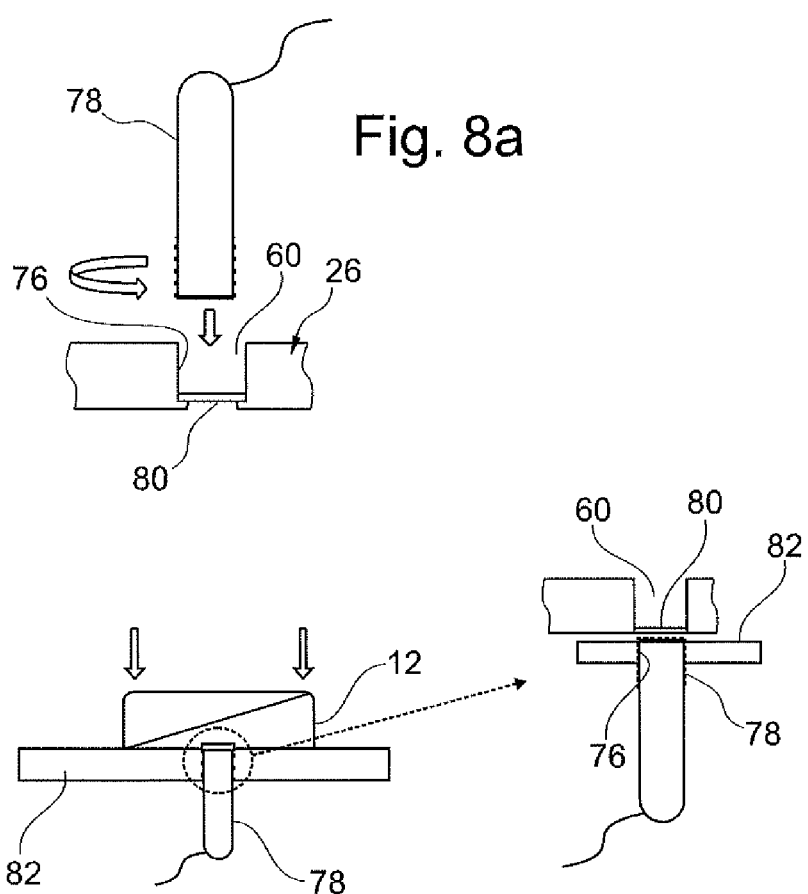
Fig. 8a
Fig. 8b

US 11,219,867 B2

SINGLE-USE FILTERING MODULE AND SINGLE-USE CLEANING MODULE, EACH INSERTABLE IN A MODULAR FILTERING SYSTEM

The invention relates to a filtration module for a modular filtration system, in particular a cross-flow filtration system, for low-volume screening applications. The invention furthermore relates to a cleaning module for such a filtration system.

BACKGROUND OF THE INVENTION

In the biopharmaceutical industry a large interest exists in the isolation and examination of proteins for robustness and behavior in ultrafiltration and diafiltration processes (US and DF) as well as of buffers for their protective or adverse effects on proteins during such UF/DF processes. This interest especially exists in early stages of development, in which only small amounts of the biological product generally are available.

Current cross-flow filtration systems and their flow paths are not designed for low-volume test methods (screening applications). Even the smallest commercially available filtration devices with a flat membrane have a membrane surface of about 50 cm$^2$. Due to their construction determined by other criteria, the known cross-flow filtration systems are not suitable for carrying out several low-volume screening processes in parallel. Another disadvantage with respect to the intended low-volume screening applications consists in that the known systems include a plurality of individual components (fluid connections, valves, sensors etc.) which must be correctly connected with each other by hose lines with great expenditure. In addition, the known large-scale systems have a correspondingly large dead volume, which is extremely inefficient in the above-mentioned applications, when only small amounts of protein solution are available. This means that only a limited number of process runs is possible. This leads to knowledge gaps, e.g. when determining cross-flow filtration process parameters or buffer conditions in order to generate a stable target molecule environment.

SUMMARY OF THE INVENTION

It is the object of the invention to provide for a product and process development as effective and efficient as possible on the basis of low-volume test methods by taking account of the above aspects.

This object is achieved by a prefabricated filtration module for a modular filtration system with the features of claim 1. Advantageous and expedient embodiments of the filtration module according to the invention are indicated in the sub-claims.

The prefabricated filtration module according to the invention is provided for a modular filtration system, in particular a cross-flow filtration system, for low-volume screening applications. The prefabricated filtration module includes fluid ports and a plurality of components adjusted to low-volume screening applications, which are firmly integrated into the filtration module. According to the invention, the entire filtration module is designed as a single-use filtration module.

The invention is based on the finding that it is advantageous to design as many as possible of the components used in a filtration process as single-use components. The complete disposal of the single-use components available already pre-sterilized not only reduces the cleaning effort as such and the related loss of time, but also eliminates the risk that e.g. residues of toxic substances or antibodies remain in the components. Such residues not only would falsify the succeeding experiments, but would also represent a health hazard for the personnel and generally a safety risk. Owing to the invention, on the other hand, most of the contaminated components of a test set-up can be exchanged all at once quickly and in an uncomplicated way by simply replacing a used filtration module by a new one.

Another essential advantage of the invention consists in that the provision of most of the components needed for a filtration experiment in a module configured as a prefabricated unit allows an extremely compact construction. Instead of usual reusable "universal components", which must be employed for a plurality of different experiments and/or large-scale applications and must be connected with each other with great expenditure, the invention provides a set of components completely connected already, which are designed especially for a particular application. The omission of connecting members such as sterile connectors or Luer, screw and TRI-clamp connecting parts etc. not only allows a design of the module of the invention optimized in terms of installation space, but also reduces the dead spaces. In particular for a low-volume screening method a special filtration module with correspondingly small-sized components can be provided, in particular a filter with an appropriate small surface area. The use of such specially designed prefabricated filtration modules is extremely simple for the user and largely excludes errors in the test set-up.

For the actual filtration operation there is provided a single-use filtration device, in particular a cross-flow filtration device, comprising a filter.

According to a first variant of the invention, the filtration device is firmly integrated into the filtration module, i.e. the filtration device is a firm part of the filtration module. In this variant, the filtration device thus cannot be connected incorrectly, and there is no additional expenditure in the construction.

According to a second variant of the invention, the filtration device is a separate single-use filtration device which can be plugged into or onto the filtration module as a unit. This variant allows the largest possible flexibility in the selection of a suitable filtration device (filter properties, filter size etc.) without the installation of the filtration device significantly increasing the construction effort. Ideally, all of the required fluid connections are established automatically at the same time when attaching or plugging in the filtration device.

The expenditure for the connection of the components needed for a particular experiment is reduced the more, the more of these components are premounted already in the filtration module. Therefore, a filtration module with a single-use flow path is found to be advantageous, into which a recirculation container for process fluid and/or at least one sensor and/or at least one flow valve and/or a pump already are firmly integrated at least in part. A storage container for diafiltration medium can also be provided already in the filtration module. In addition, the filtration module can include ports with which it is possible to supply media (e.g. diafiltration medium) from external sources.

Here, a flow path is understood to be those components of the filtration system with which the process fluid gets in contact and which specify at least a partial section of the path of the process fluid through the filtration system. In the filtration system a plurality of flow paths can be provided, also within a filtration module or cleaning module (as will yet be explained in more detail below), which can alternatively be selected depending on the chosen process sequence or can be traversed in parallel or sequentially. Here, chiefly the flow path or the flow paths within a filtration module will be considered.

In the variants of the invention explained above, the filtration device can be firmly integrated into a single-use flow path or be integrated into a single-use flow path as a separate unit, which single-use flow path in turn is firmly integrated into the filtration module. However, the single-use flow path in principle can also be inserted into the filtration module as a complete unit.

A development of the invention provides a temperature control for the filtration module. For particular experiments it is important that the temperature of the process fluid is kept constant at a particular value during the filtration; or the same experiment is to be carried out at different temperatures in order to be able to document a temperature dependence of the results. For such cases it is advantageous when the temperature of the entire filtration module can be controlled. A simple, but expedient temperature control can be achieved for example in that an outer wall of the filtration module is coupled to a temperature-controlled surface, in particular that of a Peltier element.

The idea underlying the invention can also be transferred to a special cleaning module. Such a cleaning module will serve for cleaning reusable components of the filtration system. The entire cleaning module then is designed as a single-use cleaning module so that the expenditure for cleaning is reduced considerably: On the one hand, the construction and connection of the components needed for cleaning are simplified; on the other hand, the components needed can be disposed of all at once quickly and in an uncomplicated way.

According to a particular aspect of the invention the filtration module and/or the cleaning module includes a plurality of single-use flow paths. The plurality of flow paths within the same module can be utilized in different ways depending on the chosen process sequence: For example, the flow path provided for the desired process can be selected and/or adjusted, while the further flow path or flow paths initially remains or remain unused and possibly can still be used for future experiments. Another possibility consists in utilizing two or more flow paths at the same time in one experiment or during a cleaning run. The different flow paths then can be traversed either in parallel or sequentially. The provision of a plurality of flow paths, which possibly can also each be inserted into the filtration module or cleaning module as a separate unit, thus creates even more flexibility and efficiency.

The integration of particular components into a single-use filtration module or a single-use cleaning module is not easily possible, for instance because the drive, the actuation or the signal transmission must be effected from outside, or because the exclusive use of single-use components is not expedient for such components in technical or economic terms. Therefore, it is a particular challenge to at least partly integrate such components, in particular pumps, valves or sensors, into the single-use modules.

In the case of a fluid pump, for example a pump mechanism can be provided, which is at least partly formed of single-use components which are firmly integrated into the filtration module, in particular into the filtration device, or into the cleaning module.

For example, the pump mechanism can include a single-use pump hose and a reusable drive, in particular with a rotor and a roller unit mounted thereon for deforming the single-use pump hose. There can be realized a peristaltic pump in which the pump hose is firmly integrated into the filtration module or the cleaning module as a single-use component. As the expensive drive mechanism comprising rotor and roller unit does not get in contact with the process fluid or cleaning fluid in the pump hose, it is advantageous to configure the same as an external reusable sub-unit of the pump mechanism.

In another embodiment of the pump mechanism the same includes a single-use piston-cylinder unit or a single-use pressing device and a reusable drive for actuating the piston or the pressing device. The piston-cylinder unit or pressing device, which gets in contact with the process fluid or cleaning fluid, can be firmly integrated into the filtration module, in particular into the filtration device, or into the cleaning module as a single-use construction unit, while in turn the drive can independently be configured as an external reusable sub-unit of the pump mechanism. In this way, a partly integrated piston pump or a partly integrated pump can be realized according to the principle of a manually actuatable soap dispenser or a manually actuatable spray pump, which however is driven mechanically.

The integration idea can be implemented for an externally driven or actuated valve, in that the filtration module, in particular the filtration device, or the cleaning module includes at least one valve port. On the at least one valve port of the filtration module, the filtration device or the cleaning module a valve mechanism partly formed of single-use components is arranged, wherein these single-use components are firmly integrated into the filtration module, in particular the filtration device, or into the cleaning module. The further components necessary for operating the valve can be configured as external reusable components, in particular when they do not get in direct contact with the process fluid or cleaning fluid. Preferably, these reusable components are critical components which must be particularly precise, robust and/or reliable and as single-use components used only once would lead to disproportionately high costs.

According to a first variant, the valve mechanism includes a flexible single-use hose and a reusable guided tappet. The flow cross-section of the single-use hose firmly integrated into the filtration module, in particular the filtration device, or into the cleaning module can be changed by means of the externally actuatable tappet so that in this way the throughflow quantity can be adjusted.

According to a second variant of the valve mechanism, a single-use tappet is guided in a single-use seal. With a corresponding deflection, the tappet can penetrate into a flow channel of the filtration module, in particular into a flow channel of the filtration device, or of the cleaning module, and in this way influence the throughflow quantity in a targeted way.

A third variant of the valve mechanism is based on an elastic membrane, which as a single-use component firmly integrated into the filtration module, in particular into the filtration device, or into the cleaning module, can be pressed into a flow channel of the filtration module, in particular into a flow channel of the filtration device, or of the cleaning module, by means of a reusable tappet.

In the first and the third variant of the valve mechanism it is also possible in principle to provide a compressed gas source instead of the reusable tappet for pressurizing the single-use hose or the single-use membrane.

According to the principles described above more complex control components can also be realized in principle, such as 3-way valves for modules comprising a plurality of flow paths, which can be operated and/or driven from outside the module. In any case, such a control component in part is formed of single-use components which are firmly integrated into the filtration module or the cleaning module, while the further components can be configured as external reusable components, in particular when they do not get in direct contact with the process fluid or cleaning fluid.

For detecting particular process parameters corresponding sensors are necessary. To allow the use of a sensor with a single-use filtration module and/or a single-use cleaning module it is proposed to arrange a sensor device partly formed of single-use components, in particular a pressure sensor device, on a sensor port of the filtration module, in particular on a sensor port of its filtration device, or of the cleaning module. These single-use components are firmly integrated into the filtration module, in particular into the filtration device, or the cleaning module.

According to an advantageous concept, a single-use membrane, in particular a pressure membrane, can be stretched over an orifice of the sensor port, which cooperates with a reusable sensor device, in particular a pressure sensor, arranged on the orifice. The flexible membrane hence is part of the single-use components, while the typically expensive sensor device can be reused. In the case of a deflectable, but impermeable pressure membrane the pressure sensor on the side opposite the fluid does not get in contact with the same and need not be cleaned. The membrane, however, can also deliberately be chosen to be permeable in order to branch off samples for the external examination of particular parameters such as electric conductivity, pH value, viscosity, protein concentration.

As mentioned already, the fundamental idea of the invention can also be transferred to a special cleaning module which in general is designed as a single-use module.

The cleaning module preferably includes a firmly integrated cleaning fluid container. This container either can be filled already with a cleaning fluid or serves for temporarily storing an externally supplied cleaning fluid.

The greatest advantage of the cleaning module, however, results from the fact that as regards their fluid ports and their mechanical ports the cleaning module and the filtration module are constructed such that they can alternatively be arranged and connected at the same point in a filtration system, in particular a cross-flow filtration system, for low-volume screening applications. This provides for the fact that after an experiment the used filtration module can be removed and disposed of and a cleaning module is inserted at the same point without much effort. After the cleaning run, the cleaning module in turn removed and disposed of is simply replaced by the new filtration module provided for the next experiment. In this way, a plurality of experiments can be carried out extremely efficiently in a short time.

BRIEF DESCRIPTION OF THE DRAWINGS

Further features and advantages of the invention can be taken from the following description and from the attached drawings to which reference is made. In the drawings:

FIG. 3 shows a cleaning module for a modular filtration system;

FIG. 4 shows a cross-flow filtration device with a partly integrated pump mechanism;

FIG. 5*a* shows a first variant of the pump mechanism for the cross-flow filtration device of FIG. 4;

FIG. 5*b* shows a second variant of the pump mechanism for the cross-flow filtration device of FIG. 4;

FIG. 5*c* shows a third variant of the pump mechanism for the cross-flow filtration device of FIG. 4;

FIG. 7*a* shows a first variant of a partly integrated valve mechanism of a cross-flow filtration device;

FIG. 7*b* shows a second variant of a partly integrated valve mechanism of a cross-flow filtration device;

FIG. 7*c* shows a third variant of an integrated valve mechanism of a cross-flow filtration device;

FIG. 8*a* shows a first variant of a partly integrated pressure sensor mechanism of a cross-flow filtration device; and FIG. 8*b* shows a second variant of a partly integrated pressure sensor mechanism of a cross-flow filtration device.

DETAILED DESCRIPTION OF THE INVENTION

In the following, individual modules of a cross-flow filtration system, which can be used individually or in combination with each other, and particular components of these modules will be described.

Figure 1:
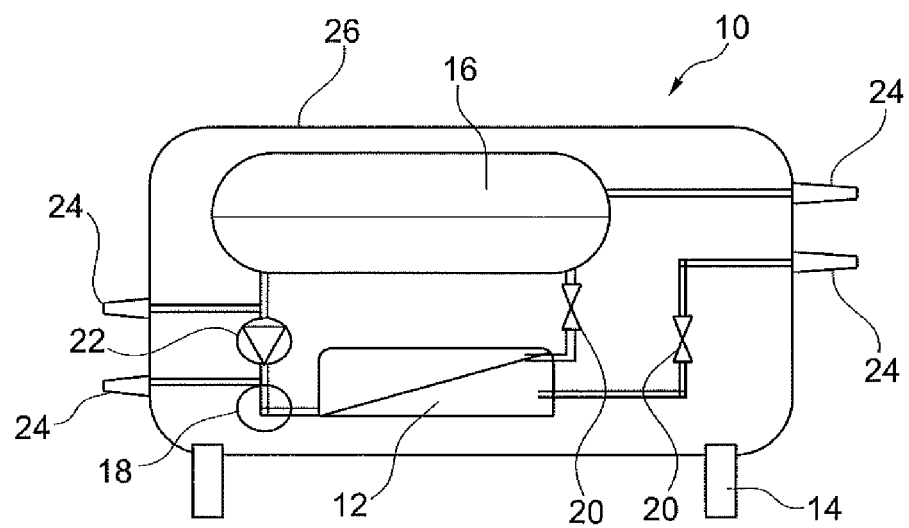
FIG. 1 shows a filtration module with a firmly integrated cross-flow filtration device for a modular filtration system.

FIG. 1 schematically shows a filtration module (cartridge) 10, with a firmly integrated filtration device, here a cross-flow filtration device 12. The filtration module 10 is provided for use in a modular filtration system. The filtration system can form an automated filtration system to which the filtration module 10 can be attached as a prefabricated unit. For this purpose, suitable connectors 14 are provided on the module housing. As the complete filtration module 10 is designed as a single-use module, it can be disposed of as a whole after use and be replaced by a new filtration module 10 for the following application.

The filtration module 10, which in the present case is provided for ultrafiltration or diafiltration, contains at least one single-use flow path into which a recirculation container 16 for process fluid, at least one part of one or more sensor devices 18, at least one externally driven flow valve 20 and at least one part of a pump 22 are integrated. The filtration module 10 also includes a cross-flow filtration device 12 which likewise is firmly integrated into the single-use flow path. Furthermore, various ports are provided at the filtration module 10, in particular the fluid ports 24 necessary for supply and for discharge. There can be provided further ports, for example fluid ports for an external pump or further ports for sensors. Of course, other components can also be integrated into the single-use flow path.

The outer wall 26 of the filtration module 10 is in contact with a temperature-controlled surface of the filtration system, for example with a Peltier element. In this way, all components of the filtration module 10 can be brought to a desired temperature, and the temperature can be kept constant during an experiment.

Figure 2:
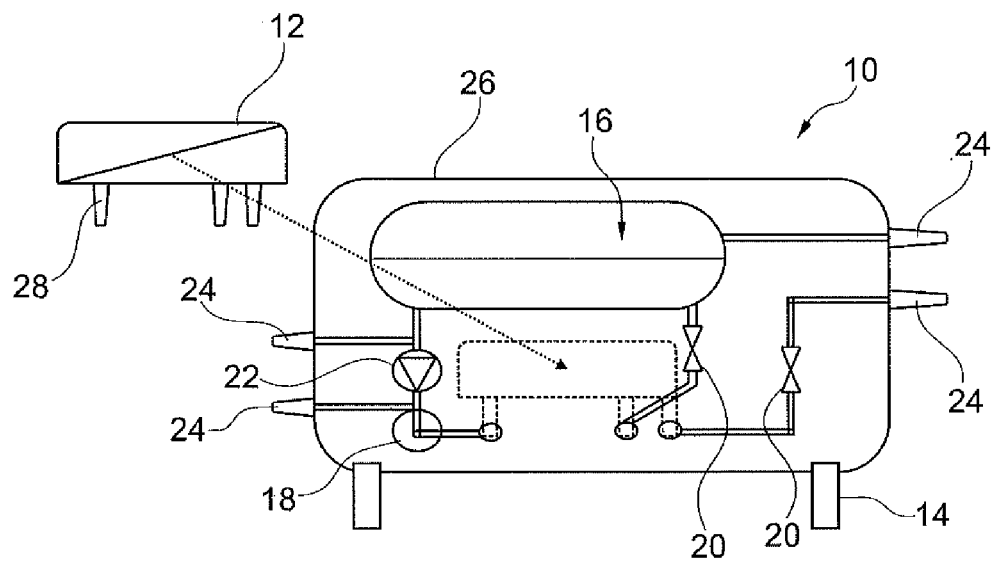
FIG. 2 shows a filtration module with an insertable cross-flow filtration device.

FIG. 2 shows a filtration module 10 which differs from the module described above in particular by the fact that the cross-flow filtration device 12 is configured as a separate single-use unit which can be inserted into the filtration module 10. The cross-flow filtration device 12 therefor includes suitable connectors 28 which are adjusted to complementary connectors of the filtration module 10 so that for example a latching connection is obtained. When attaching the cross-flow filtration device 12, all required fluid connections also are automatically established at the same time.

The cross-flow filtration device 12 hence is not firmly integrated into the filtration module 10. Rather, a device 12 suitable for the respective experiment can be selected from a plurality of different compatible cross-flow filtration devices 12 and be inserted into the filtration module 10.

In another embodiment, the flow path of the filtration module 10 is configured as a separate unit which—as described above in connection with the cross-flow filtration device 12—can be inserted into the filtration module 10. The cross-flow filtration device 12 then either is firmly integrated into the flow path or can be attached to the flow path—in turn as a separate unit. In these cases, too, latching connections preferably are provided, and all necessary fluid connections are automatically established at the same time on attachment.

FIG. 3 schematically shows a cleaning module 30 for a modular filtration system. The cleaning module 30 is constructed such that it can be used in the filtration system instead of a filtration module 10, in particular instead of one of the filtration modules 10 described above. This means that due to corresponding connectors 14, the cleaning module 30 can be attached to an automated filtration system as a prefabricated unit just like a filtration module 10.

The cleaning module 30 includes a plurality of fluid ports 24, in particular for the supply and discharge of cleaning fluid or also for the connection of an external pump. The flow path of the cleaning module 30, including a cleaning fluid container 32, is firmly integrated into the cleaning module 30. In addition, one or more sensor ports 34 and externally driven valves 20 are provided. The cleaning module 30 can include further flow paths.

The cleaning module 30 serves to clean reusable components of the filtration system by rinsing with cleaning fluid. The reusable components include for example hose lines or pumps. The cleaning fluid required therefor either can be present already in the cleaning fluid container 32 or be supplied from an external source via the fluid ports 24 of the cleaning module 30 and possibly be stored temporarily in the cleaning fluid container 32.

FIG. 4 schematically shows a cross-flow filtration device 12 with a symbolically indicated pump mechanism 36. The cross-flow filtration device 12 can be integrated into a filtration module 10 (cf. FIG. 1) or be insertable into such a module 10 as a separate unit (cf. FIG. 2). In the following, several variants of the pump mechanism 36 partly integrated into the cross-flow filtration device 12 will be described.

FIG. 5a shows a mechanism for a hose pump (peristaltic pump), in which a pump hose 38 deformable by rollers is designed as a single-use component and is firmly integrated into the cross-flow filtration device 12. A rotor with a roller unit 40 mounted thereon, which likewise are part of the pump mechanism 36, are designed as reusable separate components or as a reusable separate unit and are not firmly integrated into the cross-flow filtration device 12. The rotor with the roller unit 40 can be inserted into the cross-flow filtration device 12, e.g. by means of a click mechanism, such that the roller unit 40 is operatively connected with the pump hose 38, and the pump mechanism 36 then is immediately ready for operation.

FIG. 5b shows a mechanism for a piston pump with holding valves. The piston-cylinder unit 42 of the piston pump is designed as a single-use component and is firmly integrated into the cross-flow filtration device 12 (wherein the piston 44 of course is shiftable in the cylinder 46). The drive unit on the other hand, by means of which the piston 44 is driven, is designed as a reusable separate unit and is not firmly integrated into the cross-flow filtration device 12. The drive unit is coupled to the piston 44 in a suitable way. To maintain a continuous flow, two of such pumps can also be provided for the cross-flow filtration device 12.

FIG. 5c shows a pump mechanism 36 which is similar to the pump mechanism of a manually actuatable soap dispenser or a manually actuatable spray pump. The essential parts of the actual pump mechanism 36, including a pressing device 48, are designed as single-use components and are firmly integrated into the cross-flow filtration device 12 (wherein a part of the pressing device 48 of course is shiftable). Like in the variant described above, the drive unit by means of which the pressing device 48 is driven, is designed as a reusable separate unit and is not firmly integrated into the cross-flow filtration device 12. The drive unit is coupled to the pressing device 48 in a suitable way. To maintain a continuous flow, two of such pumps can also be provided for the cross-flow filtration device 12.

The above-described pump mechanisms 36 are not only suitable for a cross-flow filtration device 12 of the filtration module, but also for a cleaning module 30 for delivering the cleaning fluid.

The above-described pump mechanisms 36 can also be provided at points of a single-use filtration module 10 other than the points described, for example on a single-use flow path.

Figure 6A:
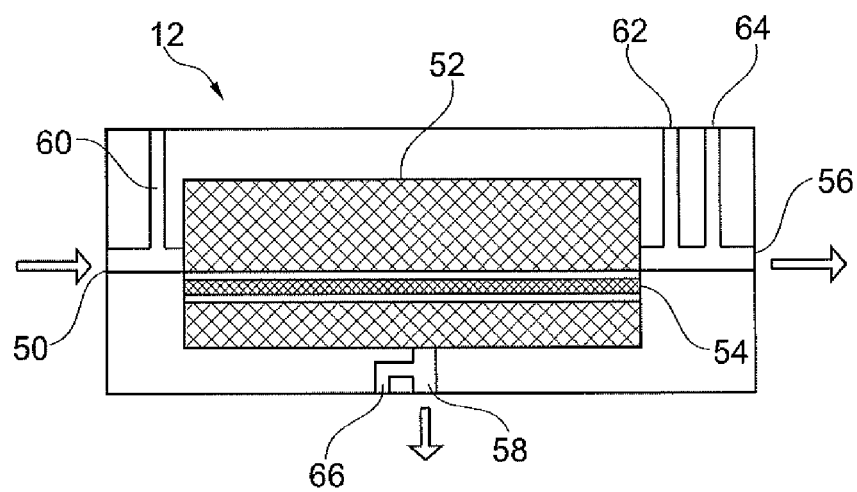
FIG. 6*a* shows a lateral sectional view of a cross-flow filtration device with various ports.
Figure 6B:
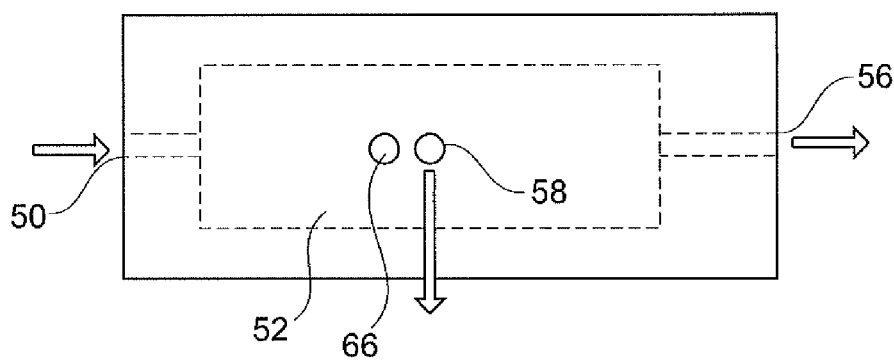
FIG. 6*b* shows a bottom view of the cross-flow filtration device of FIG. 6*a*.
Figure 6C:
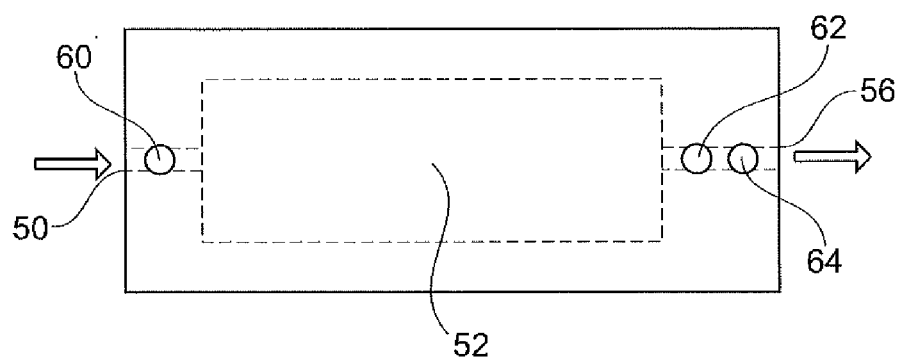
FIG. 6*c* shows a top view of the cross-flow filtration device of FIG. 6*a*.

FIGS. 6a to 6c by way of example show a cross-flow filtration device 12 with various ports in various views. The ports are firmly integrated into the cross-flow filtration device 12 or into a single-use flow path insertable into the cross-flow filtration device 12. The cross-flow filtration device 12 in turn can be integrated into a filtration module 10 (cf. FIG. 1) or be insertable into such a module 10 as a separate unit (cf. FIG. 2).

As can be seen in the sectional view of FIG. 6a, a filter device 52 with a filter membrane 54, which on a first side is overflown by the process fluid, is disposed behind a fluid inlet 50 as seen in flow direction. At a first fluid outlet 56 the retentate exits, which is left on the first side of the filter membrane 54. At a second fluid outlet 58 on the other side of the filter membrane 54 the permeate exits, which is withdrawn through the filter membrane 54 transversely to the flow direction. While the fluid inlet 50 and the first fluid outlet 56 are arranged on opposite side walls of the cross-flow filtration device 12, the second fluid outlet 58 is disposed in the bottom wall of the device 12.

Between the fluid inlet 50 and the filter device 52 a first pressure sensor port 60 is provided. More exactly, the first pressure sensor port 60 leads from the upper wall of the cross-flow filtration device 12 into the channel which extends from the fluid inlet 50 to the filter device 52. A second pressure sensor port 62 and a valve port 64 each lead from the upper wall into the channel between the filter device 52 and the first fluid outlet 56. A third pressure sensor port 66 leads from the bottom wall into the channel between the filter device 52 and the second fluid outlet 58, i.e. the second fluid outlet 58 and the third pressure sensor port 66 are arranged one beside the other.

FIGS. 7a to 7c show three variants of a valve mechanism partly integrated into the cross-flow filtration device 12, which can be used for the valve port 64 between the filter device 52 and the first fluid outlet 56 as shown in FIGS. 6a and 6c or for other valve ports of the cross-flow filtration device 12. Variants will be explained below using the example of the valve port 64.

In the variant shown in FIG. 7a, a tappet 68 is axially movably guided in the valve port 64. The channel extending from the filter device 52 to the first fluid outlet 56 is at least partly formed as an elastic hose 70. The valve port 64 is arranged such that at a first end the tappet 68 can be urged in the direction of the hose 70 so that the opposite second end of the tappet 68 compresses the hose 70. The cross-sectional area of the interior of the hose can be reduced in size and the throughflow can be reduced correspondingly. The elastic hose 70 is able to again push the tappet 68 back when no (or only a small) pressure is exerted on its second end. While the elastic hose 70 is a single-use component firmly integrated into the cross-flow filtration device 12, the tappet 68 and possible actuating elements coupled to the same, by means of which the position of the tappet 68 is adjusted, are designed as separate reusable components and are not firmly integrated into the cross-flow filtration device 12.

In contrast to the variant described above, no flexible hose is provided in the variant shown in FIG. 7b. Rather, at the orifice of the valve port 64 towards the channel extending from the filter device 52 to the first fluid outlet 56 a flexible seal 72 is provided, which seals the channel against the valve port 64. In the seal 72 a tappet 68 or a wedge is guided such that it can dip into the channel substantially perpendicularly. In this way, the flow cross-section is reduced. The tappet 68 or wedge can be moved back again by pulling. Here, both the tappet 68 or wedge and the seal 72 are designed as single-use components and are firmly integrated into the cross-flow filtration device 12 (wherein the tappet 68 of course is shiftable in the valve port 64).

In the variant shown in FIG. 7c, an elastic membrane 74 is stretched over the orifice of the valve port 64 into the channel instead of the seal. The membrane 74 can be pressed into the channel by a tappet 68 such that the flow cross-section is reduced. The membrane 74—similar to the hose 70 in the variant of FIG. 7a—represents a sterile barrier so that the tappet 68 and possible actuating elements coupled to the same, by means of which the position of the tappet 68 is adjusted, can be designed as separate reusable components and correspondingly are not firmly integrated into the cross-flow filtration device 12, while the membrane 74 is a single-use component firmly integrated into the cross-flow filtration device 12.

In particular in the variant described last, compressed gas can also be used for deflecting the membrane 74 instead of the tappet 68.

A valve port can also be provided at points of a single-use filtration module 10 other than the points described, at a single-use flow path or at a cleaning module 30.

FIGS. 8a and 8b show two variants of a pressure sensor mechanism partly integrated into a cross-flow filtration device 12, as they can be used for example in the pressure sensor ports 60, 62, 66 to be seen in FIGS. 6a to 6c.

In the variant shown in FIG. 8a, a thread 76 is incorporated at an outside end of the pressure sensor port 60, e.g. into an orifice in the outer wall of the cross-flow filtration device 12, a flange, a connecting port or the like, into which a pressure sensor 78 with the appropriate counter-thread is screwed. A pressure membrane 80 made of an elastomer is clamped at the outside end of the pressure sensor port 60 such that its pressure-dependent deflection triggers a corresponding signal in the pressure sensor 78. While the pressure membrane 80 is a single-use component firmly integrated into the cross-flow filtration device 12, the pressure sensor 78 is designed as a reusable separate component and is not firmly integrated into the cross-flow filtration device 12.

In the variant shown in FIG. 8b, in contrast to the variant described above, the pressure sensor 78 is not screwed into a thread of the cross-flow filtration device 12, but into a thread 76 which is formed in an opening of a base plate 82 of the filtration system. On this base plate 82, the cross-flow filtration device 12 with the pressure membrane 80 is arranged and fastened above the pressure sensor 78 such that upon pressurization the pressure membrane 80 is deflected in the direction of the pressure sensor 78 and a corresponding signal is triggered in the pressure sensor 78.

The pressure membrane 80 and/or the pressure sensor 78 can also be provided at points of a single-use filtration module 10 other than the points described, at a single-use flow path or at a cleaning module 30.

Other sensor devices can also be provided at such ports on a cross-flow filtration device 12 or at another point of a single-use filtration module 10, at a single-use flow path or a cleaning module 30, such as sensor devices for determining the electric conductivity, the pH value, the viscosity or the protein concentration by using a suitable UV sensor or other spectroscopy. In these cases, a permeable membrane or another device is provided instead of the pressure membrane 80 to branch off a fluid quantity.

The automated filtration system with the described modules 10, 30 and components chiefly is provided for the concentration and diafiltration (especially for the stabilization, final formulation and/or separation of impurities) of protein solutions by a cross-flow technology. The modules 10, 30 and components can be adapted to various kinds of cross-flow filtration, in particular to so-called "single-pass", "batch" or "feed-and-bleed" configurations. In principle, the automated filtration system can also be designed for other filtration technologies, such as the classical "dead-end" filtration.

LIST OF REFERENCE NUMERALS 10 filtration module
12 cross-flow filtration device
14 connector (module)
16 recirculation container
18 sensor device
20 valve
22 pump
24 fluid port
26 outer wall
28 connector (cross-flow filtration device)
30 cleaning module
32 cleaning fluid container
34 sensor port
36 pump mechanism
38 pump hose
40 roller unit
42 piston-cylinder unit
44 piston
46 cylinder
48 pressing device
50 fluid inlet
52 filter device
54 filter membrane
56 first fluid outlet
58 second fluid outlet
60 first pressure sensor port
62 second pressure sensor port 64 valve port
66 third pressure sensor port
68 tappet
70 hose
72 seal
74 membrane
76 thread
78 pressure sensor
80 pressure membrane
82 base plate

The invention claimed is:

1. A prefabricated filtration module for a modular cross-flow filtration system, for low-volume screening applications, wherein the filtration module includes fluid ports and a plurality of components adjusted to low-volume screening applications, which are firmly integrated into the filtration module, wherein the entire filtration module is designed as a single-use filtration module and wherein a cross-flow filtration device comprising a filter is firmly integrated into the filtration module or a single use cross-flow filtration device comprising a filter is plugged into or onto the filtration module as a unit firmly integrated as a unit, further comprising a temperature control for the filtration module, wherein an outer wall of the filtration module is coupled to a temperature-controlled surface.

2. The filtration module according to claim 1, characterized by a separate single-use cross-flow filtration device comprising a filter and plugged into or onto the filtration module as a unit.

3. The filtration module according to claim 1, characterized by a firmly integrated cross-flow filtration device comprising a filter.

4. The filtration module according to claim 1, characterized by a single-use flow path into which at least one of the following components at least partly is firmly integrated: a recirculation container for process fluid; a sensor; a flow valve; a pump; a storage container for a diafiltration medium; a port for supplying a medium from an external source.

5. The filtration module according to claim 4, characterized in that the filtration device is firmly integrated into the single-use flow path.

6. The filtration module according to claim 1, characterized by a plurality of single-use flow paths.

7. The filtration module according to claim 1, characterized by at least one pump mechanism which is at least partly formed of single-use components which are firmly integrated into the filtration device.

8. The filtration module according to claim 7, characterized in that the pump mechanism includes a single-use pump hose and a reusable drive with a rotor and a roller unit mounted thereon for deforming the single-use pump hose.

9. The filtration module according to claim 7, characterized in that the pump mechanism includes a single-use piston-cylinder unit or a single-use pressing device and a reusable drive for actuating the piston or the pressing device.

10. The filtration module according to claim 1, characterized in that the filtration device includes at least one valve port on which a valve mechanism partly formed of single-use components is arranged, wherein the single-use components are firmly integrated into the filtration device.

11. A prefabricated filtration module for a modular cross-flow filtration system, for low-volume screening applications, wherein the filtration module includes fluid ports and a plurality of components adjusted to low-volume screening applications, which are firmly integrated into the filtration module, wherein the entire filtration module is designed as a single-use filtration module and wherein a cross-flow filtration device comprising a filter is firmly integrated into the filtration module or a single use cross-flow filtration device comprising a filter is plugged into or onto the filtration module as a unit firmly integrated as a unit,
wherein the filtration device includes at least one valve port on which a valve mechanism partly formed of single-use components is arranged, wherein the single-use components are firmly integrated into the filtration device; and
wherein the valve mechanism includes one of:
a flexible single-use hose and a reusable guided tappet by means of which a flow cross-section of the single-use hose can be changed,
a single-use tappet guided in a single-use seal, which can penetrate into a flow channel of the filtration device,
an elastic single-use membrane which by means of a reusable tappet can be pressed into a flow channel of the filtration device, or
a flexible single-use hose or an elastic single-use membrane, wherein a compressed gas source is provided for pressurizing the single-use hose or the single-use membrane.

12. The filtration module according to claim 1, characterized in that the filtration device includes at least one sensor port on which a pressure sensor device partly formed of single-use components is arranged, wherein the single-use components are firmly integrated into the filtration device.

13. The filtration module according to claim 12, characterized in that a single-use membrane is stretched over an orifice of the sensor port, which cooperates with the reusable pressure sensor device arranged on the orifice.

14. A cross-flow filtration system for low-volume screening applications, comprising a filtration module according to claim 6 and a cleaning module comprising fluid ports, a plurality of single-use flow paths, a firmly integrated cleaning fluid container and a pump mechanism, wherein the fluid ports and the mechanical ports of the filtration module and the cleaning module are constructed such that they can alternatively be arranged and connected at a same point in the filtration system.

* * * * *